United States Patent
Aoyagi et al.

(10) Patent No.: US 8,130,883 B2
(45) Date of Patent: Mar. 6, 2012

(54) PULSE SIGNAL RECEPTION DEVICE, PULSED QPSK SIGNAL RECEPTION DEVICE, AND PULSE SIGNAL RECEPTION METHOD

(75) Inventors: Hideki Aoyagi, Miyagi (JP); Hitoshi Asano, Miyagi (JP); Michiaki Matsuo, San Jose, CA (US)

(73) Assignee: Panasonic Corporation, Osaka (JP)

( * ) Notice: Subject to any disclaimer, the term of this patent is extended or adjusted under 35 U.S.C. 154(b) by 694 days.

(21) Appl. No.: 12/297,567

(22) PCT Filed: Apr. 12, 2007

(86) PCT No.: PCT/JP2007/058093
§ 371 (c)(1),
(2), (4) Date: Dec. 2, 2008

(87) PCT Pub. No.: WO2007/123049
PCT Pub. Date: Nov. 1, 2007

(65) Prior Publication Data
US 2009/0252258 A1    Oct. 8, 2009

(30) Foreign Application Priority Data

Apr. 19, 2006 (JP) ................................ 2006-115759
Apr. 9, 2007 (JP) ................................ 2007-102085

(51) Int. Cl.
*H03K 7/02* (2006.01)
(52) U.S. Cl. ........ 375/353; 375/354; 375/316; 375/293; 375/376
(58) Field of Classification Search .................. 375/329, 375/354, 316, 376, 353, 293
See application file for complete search history.

(56) References Cited

U.S. PATENT DOCUMENTS

| 6,236,697 B1 * | 5/2001 | Fang ............................. 375/376 |
| 6,567,484 B1 | 5/2003 | Hirota |
| 2002/0079938 A1 | 6/2002 | Saeki |
| 2002/0154373 A1 | 10/2002 | Akashi |

(Continued)

FOREIGN PATENT DOCUMENTS

EP    1 009 125    6/2000

(Continued)

OTHER PUBLICATIONS

International Search Report dated Jun. 26, 2007.

*Primary Examiner* — Eva Puente
(74) *Attorney, Agent, or Firm* — Dickinson Wright PLLC

(57) ABSTRACT

A pulse signal reception device of a comparatively simple configuration detects a signal sampled at an optimal clock timing for a pulse modulation signal having a signal width shorter than a symbol frequency. In this device, a time division unit (103) samples a data signal at a clock signal rise edge and outputs the sampled data signals to counters (104-1 to 104-3), respectively. The counters (104-1 to 104-3) count the number of High levels when the data signal becomes High level within a predetermined period, and a maximum value detection unit (105) outputs maximum data string information on a data string counted by a counter in which the maximum number of High levels has been detected among the counters (104-1 to 104-3) to a selection data judgment unit (106). The selection data judgment unit (106) judges which data string sampled at a particular timing is to be selected as a demodulation data string.

8 Claims, 11 Drawing Sheets

U.S. PATENT DOCUMENTS

| | | |
|---|---|---|
| 2003/0041292 A1 | 2/2003 | Lee |
| 2003/0185312 A1* | 10/2003 | Atias et al. .......... 375/293 |
| 2004/0141546 A1 | 7/2004 | Nakamura |
| 2008/0031385 A1* | 2/2008 | Aung et al. .......... 375/316 |

FOREIGN PATENT DOCUMENTS

| | | |
|---|---|---|
| JP | 2000-31951 | 1/2000 |
| JP | 2000-174736 | 6/2000 |
| JP | 2002-190724 | 7/2002 |
| JP | 2003-134097 | 5/2003 |
| JP | 2003-222670 | 8/2003 |
| JP | 2004-215220 | 7/2004 |
| WO | 01/59982 | 8/2001 |

* cited by examiner

FIG.4A

| | | T1 | T2 | T3 | | | | | |
|---|---|---|---|---|---|---|---|---|---|
HIGHEST COUNT DATA SEQUENCE INFORMATION S17

| t1 | t1 | t1 | t1 | $t2_1$ | $t2_2$ | t1 | t1 | t1 | t1 |

SELECTION DATA SEQUENCE INFORMATION S18

| t1 | t1 | t1 | t1 | t1 | t1 | t1 | t1 | t1 | t1 |

SELECTION INFORMATION IS NOT CHANGED

FIG.4B

HIGHEST COUNT DATA SEQUENCE INFORMATION S17

| | | | T1 | T2 | Tn | Tn+1 | Tn+2 | Tn+3 | Tn+4 |
|---|---|---|---|---|---|---|---|---|---|
| t1 | t1 | t1 | t1 | $t2_1$ | $t2_n$ | $t2_{n+1}$ | $t2_{n+2}$ | $t2_{n+3}$ | |

SELECTION DATA SEQUENCE INFORMATION S18

| t1 | t1 | t1 | t1 | t1 | t1 | $t2_{n+1}$ | $t2_{n+2}$ | $t2_{n+3}$ |

SELECTION INFORMATION IS CHANGED

PULSE SIGNAL RECEPTION DEVICE, PULSED QPSK SIGNAL RECEPTION DEVICE, AND PULSE SIGNAL RECEPTION METHOD

TECHNICAL FIELD

The present invention relates to a pulse signal receiving apparatus, pulse QPSK signal receiving apparatus and pulse signal receiving method. More particularly, the present invention relates to a pulse signal receiving apparatus, pulse QPSK signal receiving apparatus and pulse signal receiving method for receiving a pulse modulated signal employing as the signal width a shorter time width than the symbol period.

BACKGROUND ART

Conventionally, a clock recovery (clock reproduction) technique of recovering the clock signal from a received signal has been generally used in a receiving apparatus as a method of generating the clock signal required upon demodulation processing (for example, see Patent Document 1). FIG. 1 is a block diagram showing a main configuration of the receiving apparatus disclosed in Patent Document 1. In the receiving apparatus shown in FIG. 1, clock recovering circuit 13 recovers the clock signal from a received signal. The basic operation of clock recovery in clock recovering circuit 13 includes detecting points of level change of the received signal, controlling the frequency and phase of the clock signal held in clock recovering circuit 13 to synchronize with the detected points of level change and outputting the signal after control, as a recovered clock signal.

Patent Document 1: Japanese Patent Application Laid-Open No. 2004-215220

DISCLOSURE OF INVENTION

Problems to be Solved by the Invention

However, if the above clock recovery technique is applied to the pulse modulated signal, an optimal clock cannot be necessarily recovered at all times. That is, if the clock recovery technique is applied to the pulse modulated signal, the clock having a frequency, which matches the signal width instead of the symbol period, is recovered. Consequently, according to the clock recovery technique, if a pulse modulated signal employing a shorter signal width than the symbol period is sampled using a recovered clock, the pulse modulated signal is sampled at sampling points at which sampling needs not to be performed essentially. Consequently, the clock recovery technique produces a problem that it is difficult to use the sampled signal as is for the demodulated signal.

It is therefore an object of the present invention to provide a pulse signal receiving apparatus, pulse QPSK signal receiving apparatus and pulse signal receiving method that make it possible to detect a signal sampled at optimal clock timing, from a pulse modulated signal employing a shorter signal width than the symbol period with a comparatively simple configuration.

Means for Solving the Problem

To solve the above problem, the pulse signal receiving apparatus according to the present invention employs a configuration including: a receiving section that receives a pulse signal; a binarizing section that performs threshold decision of a voltage of the pulse signal and converts the voltage of the pulse signal into a binary signal; a clock data recovery section that obtains a clock synchronized with the binary signal and recovered data obtained by sampling the binary signal using the clock; a time-dividing section that time-divides the recovered data into a plurality of data sequences; a counting section that counts a number of times recovered data is counted in a predetermined period on a per data sequence basis; and a data selecting section that selects a data sequence to be demodulated, from the plurality of data sequences, based on count values counted by the counting section.

According to this configuration, in a case where a pulse signal that employs as the signal width a shorter time width than the symbol period and that is transmitted at a predetermined timing in the symbol period, is received, if a clock is recovered by the clock recovery technique from a binary signal resulting from threshold decision of the voltage of the pulse signal, a recovered clock that employs as the clock period a shorter period than the symbol period, is generated. In this way, although recovered data sampled at the rising edges of the recovered clock includes undesired data, by time-dividing the recovered data into a plurality of data sequences and selecting a candidate of a data sequence for actual use from a plurality of data sequences based on whether or not there is recovered data included in time-divided data sequences, it is possible to remove undesired data. Consequently, the configuration of the present invention makes it possible to demodulate a pulse signal that employs as the signal width a shorter time width than the symbol period, with a comparatively simple configuration.

Advantageous Effect of the Invention

According to the present invention, it is possible to provide a pulse signal receiving apparatus, pulse QPSK signal receiving apparatus and pulse signal receiving method that make it possible to detect a signal sampled at optimal clock timing from a pulse modulated signal having a shorter signal width than the symbol period with a comparatively simple configuration.

BRIEF DESCRIPTION OF DRAWINGS

FIG. 4 is a timing chart for illustrating the operation of a selected data deciding section according to Embodiment 1;

BEST MODE FOR CARRYING OUT THE INVENTION

Hereinafter, embodiments of the present invention will be described with reference to the accompanying drawings.

Embodiment 1

Figure 1:
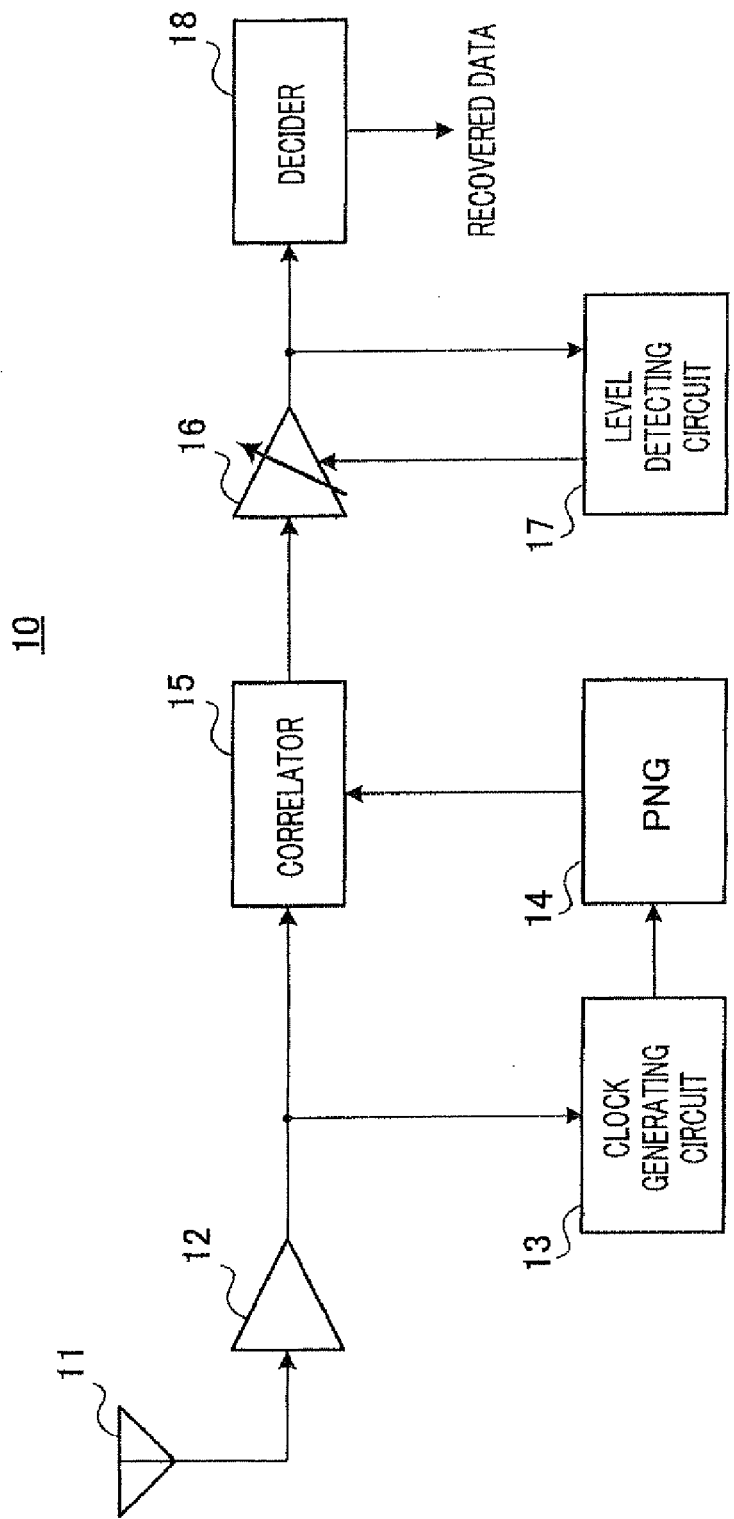
FIG. 1 is a block diagram showing a main configuration of a conventional receiving apparatus.
Figure 2:
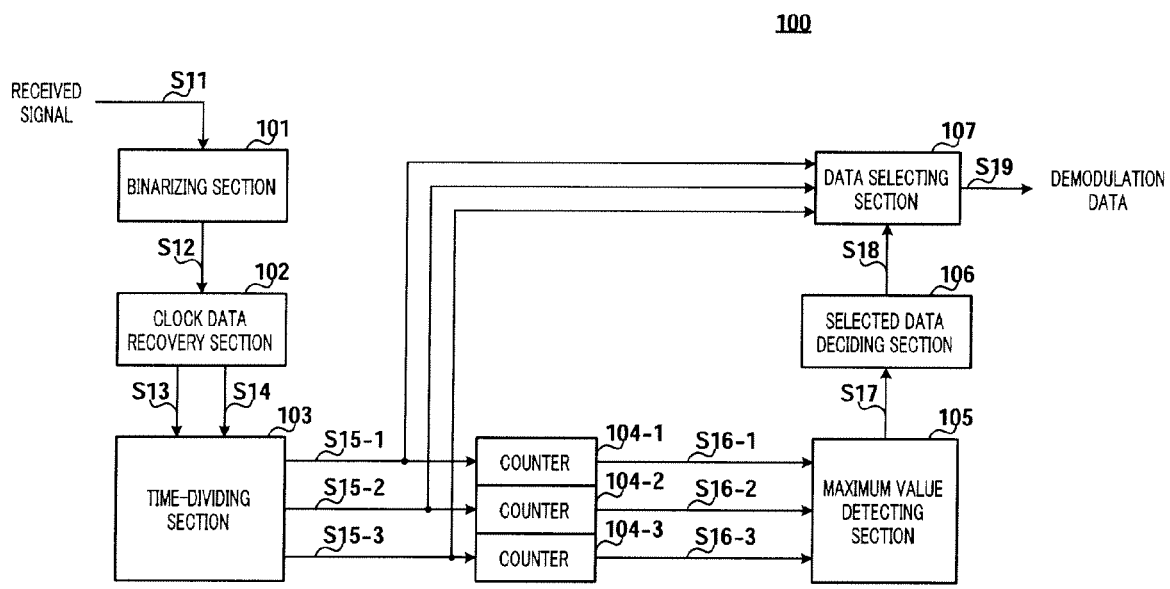
FIG. 2 is a block diagram showing a main configuration of a pulse signal receiving apparatus according to Embodiment 1 of the present invention.
Figure 3:
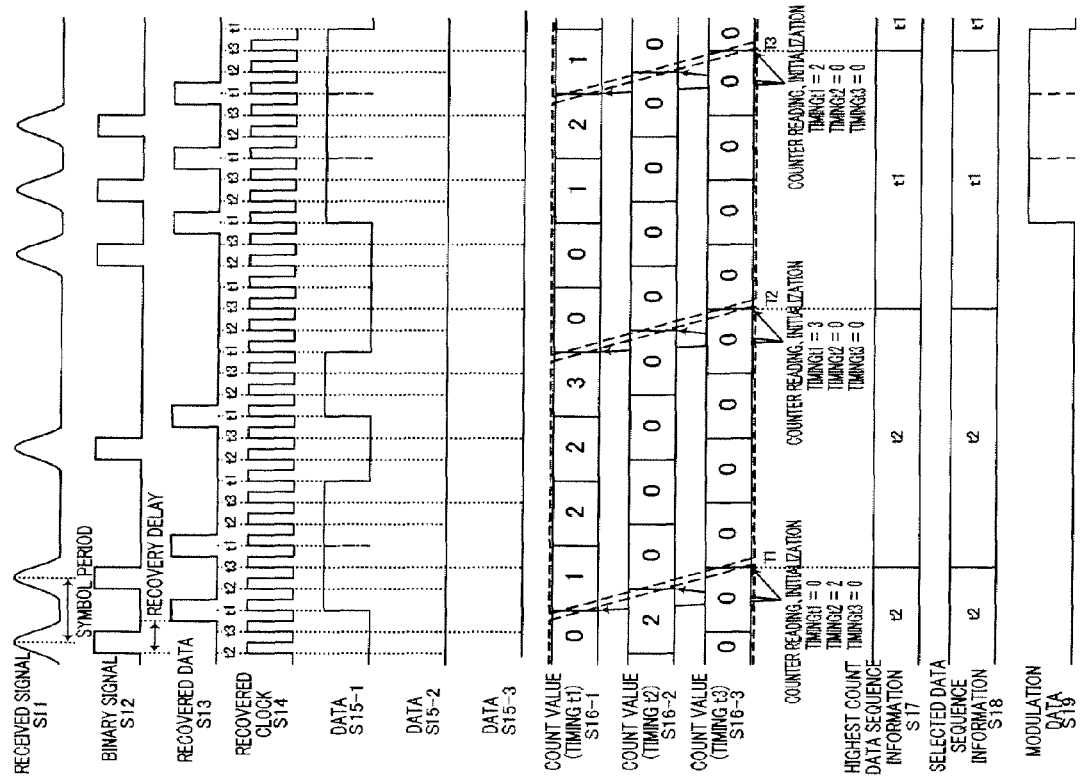
FIG. 3 is a timing chart for illustrating the operation of the pulse signal receiving apparatus according to Embodiment 1.

FIG. 2 shows a main configuration of a pulse signal receiving apparatus according to Embodiment 1 of the present invention. Further, FIG. 3 is a timing chart of each section of the pulse signal receiving apparatus.

Pulse signal receiving apparatus 100 shown in FIG. 2 has binarizing section 101, clock data recovery section 102, time-dividing section 103, counters 104-1, 104-2 and 104-3, maximum value detecting section 105, selected data deciding section 106 and data selecting section 107.

Binarizing section 101 performs threshold decision of an amplitude level of received signal S11 received through an antenna, converts the amplitude level of received signal S11 into the binary represented by the low level or the high level, and outputs binary signal S12 after conversion to clock data recovery section 102.

Clock data recovery section 102 generates recovered data S13 and recovered clock S14 from binary signal Sl2. To be more specific, clock data recovery section 102 detects points of level change of the received signal of binary signal S12. Next, clock data recovery section 102 controls the frequency and phase of the clock signal held in clock data recovery section 102 to synchronize with the points of level change and generates the controlled clock signal, as recovered clock S14. Hereinafter, a case will be described as an example where a pulse signal having a pulse width of a one-third of one symbol period, is transmitted from a communicating party (not shown), and, as shown in FIG. 3, binarizing section 101 generates a binary signal having a pulse width of a one-third of one symbol period.

Clock data recovery section 102 generates recovered clock S14 having rising edges at timings t1, t2 and t3 (hereinafter "sampling timings") in one symbol period. Clock data recovery section 102 acquires recovered data S13 by sampling binary signal S12 at the rising edges of recovered clock S14. Clock data recovery section 102 outputs generated recovered data S13 and recovered clock S14 to time-dividing section 103.

Time-dividing section 103 samples recovered data S13 at sampling timings t1, t2 and t3 of recovered clock S14. Next, time-dividing section 103 outputs data S15-1 sampled at sampling timing t1 to counter 104-1, data S15-2 sampled at sampling timing t2 to counter 104-2 and data S15-3 sampled at sampling timing t3 to counter 104-3. Further, time-dividing section 103 outputs data S15-1, S15-2 and S15-3 to data selecting section 107. Further, the number of samples taken in one symbol period is not limited to three. If clock data recovery section 102 generates a clock having four or more rising edges in one symbol period, time-dividing section 103 samples recovered data S13 at every rising edge and time-divides the recovered data into four data sequences.

Counters 104-1, 104-2 and 104-3 count the numbers of times data S15-1, S15-2 and S15-3 each show the high level in a predetermined period and output the counted numbers of times the high level is counted, to maximum value detecting section 105. The numbers of times the high level is counted represent the numbers of items of recovered data included in data S15-1 to S15-3, respectively. Further, as described above, time-dividing section 103 assumes a case where recovered data S13 is sampled three times per symbol period. Consequently, although pulse signal receiving apparatus 100 has three counters, the number of samples taken in one symbol period is not limited to three, and the same number of counters as the number of times recovered data S13 is sampled in one symbol period by time-dividing section 103 may be provided.

Maximum value detecting section 105 detects the greatest number of times the high level is counted, from the numbers of times the high level is counted outputted from counters 104-1, 104-2 and 104-3. Next, maximum value detecting section 105 outputs information related to the data sequence counted by a counter in which the high level is counted the greatest number of times, that is, information related to the data sequence showing recovered data the greatest number of items (hereinafter "highest count sequence information"), to selected data deciding section 106. Highest count data sequence information S17 may be information associated one to one with a time-divided data sequence such as information related to the sampling timing at which the data sequence showing the high level the greatest number of times, is sampled or information related to the counter in which the high level is counted the greatest number of times. A case will be described below where the sampling timing at which the data sequence showing the high level the greatest number of times, is sampled, is used as highest count data sequence information S17.

Using highest count data sequence information S17 outputted from maximum value detecting section 105, selected data deciding section 106 decides which data sequence must be selected as a demodulation data sequence, from data S15-1, S15-2 and S15-3 sampled at sampling timings t1, t2 and t3. Next, selected data deciding section 106 outputs information related to the decided data sequence to data selecting section 107 as selected data sequence information S18.

To be more specific, selected data deciding section 106 monitors the change of highest count data sequence information S17, and, even if highest count data sequence information S17 changes, does not change selected data sequence information S18 immediately. If highest count data sequence information S17 continues showing the same information a predetermined number of times or more after highest count data sequence information S17 changes, selected data deciding section 106 changes selected data sequence information S18. A method of deciding which data sequence must be selected as the demodulation data sequence and changing selected data sequence information S18 in selected data deciding section 106, will be described below using FIG. 4. FIG. 4 shows an example where highest count data sequence information S17 and selected data sequence information S18 transition over time.

FIG. 4A shows a case where highest count data sequence information S17 changes from sampling timing t1 to sampling timing t2 at counter reading timing T1, highest count data sequence information S17 keeps sampling timing t2 at counter reading timing T2 and highest count data sequence information S17 changes from sampling timing t2 to sampling timing t1 again at counter reading timing T3.

In this way, in a case where highest count data sequence information S17 changes from sampling timing t1 to sampling timing t2 and the condition of sampling timing t2 after the change continues less than a predetermined number of times (n times), selected data deciding section 106 outputs information related to data S15-1 instead of data S15-2 to data selecting section 107 as selected data sequence information S18. Further, although FIG. 4A shows an example of a case where sampling timing t1 at which data S15-1 is sampled is used as selected data sequence information S18, selected data sequence information S18 is not limited to the sampling timing and may be information associated one to one with data S15-1.

On the other hand, in a case where, as shown in FIG. 4B, highest count data sequence information S17 changes from sampling timing t1 to sampling timing t2 at counter reading timing T1 and then highest count data sequence information S17 continues keeping the condition of sampling timing t2 by counter reading timing Tn, selected data deciding section 106 outputs information related to data S15-2 to data selecting section 107 as selected data sequence information S18 after counter reading timing Tn+1.

In this way, in the pulse signal receiving apparatus of the present embodiment, if highest count data sequence information S17 changes, the data sequence matching highest count data sequence information S17 after the change, is not selected immediately as demodulation data S19, and, if highest count data sequence information S17 changes and highest count data sequence information S17 after the change continues a predetermined number of times or more, the data sequence matching highest count data sequence information S17 after the change, is selected as demodulation data S19. Consequently, the pulse signal receiving apparatus of the present embodiment is able to prevent a data sequence in which the number of times the high level is counted temporarily increases due to the influence of noise, from being selected as demodulation data S19, and increase the rate the data sequence sampled at optimal sampling timing is selected as demodulation data S19.

Data selecting section 107 selects a data sequence matching selected data sequence information S18 as demodulation data S19, from data S15-1, S15-2 and S15-3 outputted from time-dividing section 103.

Next, the operation of pulse signal receiving apparatus 100 configured as described above will be described with reference to the timing chart of FIG. 3.

Binarizing section 101 performs threshold decision of received signal S11, converts received signal S11 into binary signal S12 represented by the low level or the high level, and outputs the result to clock data recovery section 102.

Then, clock data recovery section 102 generates recovered data S13 and recovered clock S14 from binary signal S12 and outputs recovered data S13 and recovered clock S14 to time-dividing section 103. For example, in a case where recovered data S13 has a pulse width of a one-third of one symbol period as shown in FIG. 3, a clock having rising edges at timings t1, t2 and t3 in one symbol period, is generated as recovered clock S14.

Then, time-dividing section 103 samples recovered data S13 using t1, t2 and t3 of recovered clock S14 as sampling timings. Next, time-dividing section 103 time-divides sampled data into data S15-1, S15-2 and S15-3, per sampling timing. That is, recovered data S13 sampled at timing t1 of recovered clock S14 is distributed to data S15-1. Further, recovered data S13 sampled at timing t2 of recovered clock S14 is distributed to data S15-2. Furthermore, recovered data S13 sampled at timing t3 of recovered clock S14 is distributed to data S15-3.

Then, data S15-1, 15-2 and 15-3 sampled at timings t1, t2 and t3, respectively, are outputted to data selecting section 107 and further outputted to counters 104-1, 104-2 and 104-3, respectively. Counters 104-1, 104-2 and 104-3 count the numbers of times data S15-1, 15-2 and 15-3 each show the high level in a predetermined period. Although for count values S16-1, S16-2 and S16-3 of FIG. 3, the numbers of times the high level is counted every four symbols by setting the above predetermined period with four symbols, the predetermined period is not limited to four symbols and may be adjusted according to the symbol rate and channel conditions.

Then, the numbers of times the high level is counted every four symbols are outputted to maximum value detecting section 105. Next, maximum value detecting section 105 outputs information related to the data sequence showing the high levels the greatest number of times (i.e. highest count data sequence information), to selected data deciding section 106, per predetermined period. For example, upon comparison of the numbers of times the high level is counted at counter reading timing T2 shown in FIG. 3, S16-1 shows three, S16-2 shows zero and S16-3 shows zero. Given that data S15-1 is the data sequence showing the high level the greatest number of times, sampling timing t1 at which data S15-1 is sampled, is outputted to selected data deciding section 106 as highest count data sequence information S17.

Then, selected data deciding section 106 monitors transition of highest count data sequence information S17. Selected data deciding section 106 decides which data sequence must be selected as demodulation data from data S15-1, S15-2 and S15-3 sampled at sampling timings t1, t2 and t3, respectively, depending on the transition. Next, selected data deciding section 106 outputs information related to decided data to data selecting section 107 as selected data sequence information S18.

Then, data selecting section 107 selects data matching selected data sequence information S18 from data S15-1, S15-2 and S15-3 outputted from time-dividing section 103 as demodulation data S19. In the example described above, given that selected data sequence information S18 is t1 at counter reading timings T2 to T3, data S15-1 sampled at timing t1 is selected as demodulation data S19.

As described above, according to the present embodiment, in a case where a pulse signal that employs as the pulse width a shorter time width than the symbol period and that is transmitted at a predetermined timing in the symbol period is received, the received signal is converted into a binary signal represented by the low level or the high level by performing threshold decision of the received signal. Next, using the conventional clock recovery technique, a clock signal and a data signal are recovered from the binary signal after conversion. Next, at the timing of the rising edges of the clock signal, the data signal is over-sampled. Next, the over-sampled data signal is time-divided into the same number of data sequences as the number of periods in the clock signal included in one symbol period. Next, the highest count data sequence showing the high level the greatest number of times in a predetermined period is detected from the time-divided data sequences. Next, the demodulation data sequence in the predetermined period is selected from the time-divided data sequences according to the detected highest count data sequence.

By contrast with this, first, the conventional art recovers a clock signal using the conventional clock recovery technique for a pulse signal that employs as the pulse width a shorter time width than the symbol period. Next, the clock signal synchronized with a shorter pulse width than the symbol period is recovered. Therefore, according to the conventional art, there are cases where undesired data is sampled at a timing at which there is no data essentially.

As described above, according to the present embodiment, it is possible to remove undesired data with a comparatively simple configuration as compared to the conventional art and extract only desired data sampled at the desired sampling timings.

Embodiment 2

Figure 5:
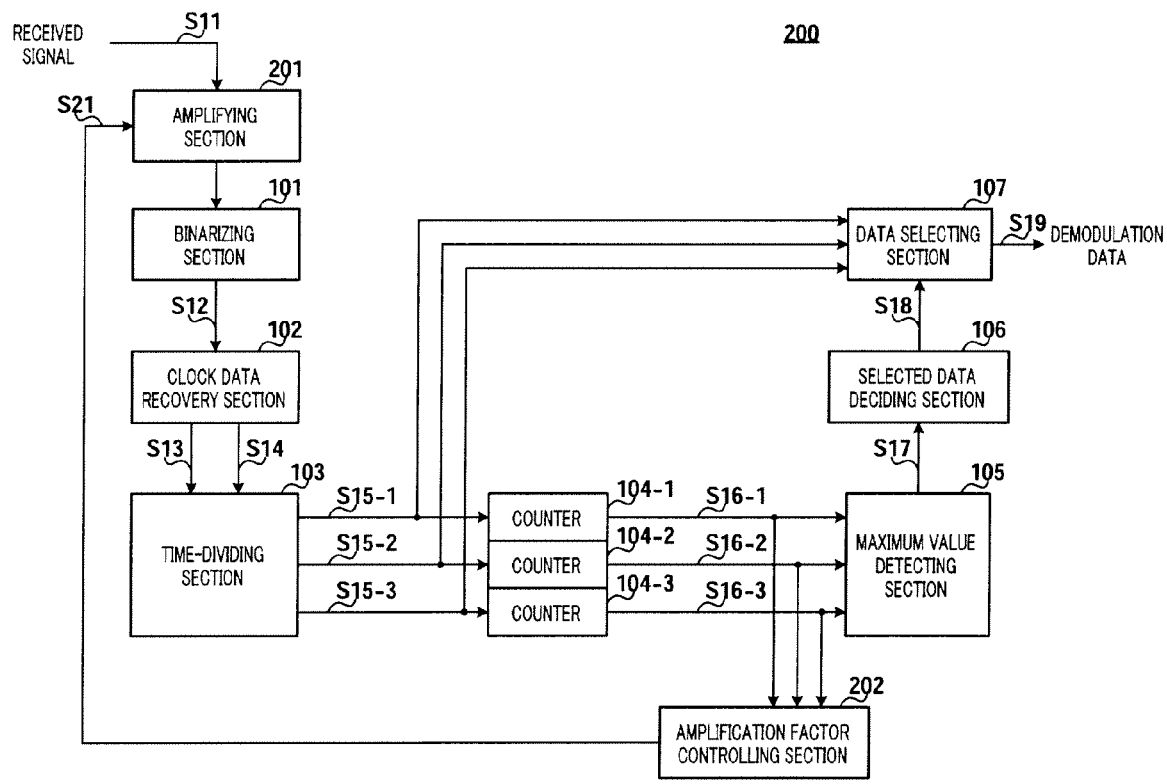
FIG. 5 is a block diagram showing a main configuration of the pulse signal receiving apparatus according to Embodiment 2 of the present invention.

FIG. 5 shows a main configuration of the pulse signal receiving apparatus according to Embodiment 2 of the present invention. In pulse signal receiving apparatus 200 of Embodiment 2 of the present invention in FIG. 5, the same components in common with FIG. 2 will be assigned the same reference numerals as in FIG. 2 and repetition of description will be omitted. FIG. 5 shows a configuration that adds amplifying section 201 and amplification factor controlling section 202 to the configuration of FIG. 2.

Amplifying section 201 amplifies received signal S11 according to the amplification factor determined in amplification factor controlling section 202 and outputs the result to binarizing section 101.

Amplification factor controlling section 202 determines the amplification factor in amplifying section 201 using count values S16-1, S16-2 and S16-3, which are counted by counters 104-1, 104-2 and 104-3 as the number of times the high level is counted, and outputs information related to the determined amplification factor to amplifying section 201.

Hereinafter, the method of determining the amplification factor in amplification factor controlling section 202 will be described using the timing chart of FIG. 6. FIG. 6 illustrates that the number of times the high level is counted, changes according to the amplification factor.

Figure 6A:
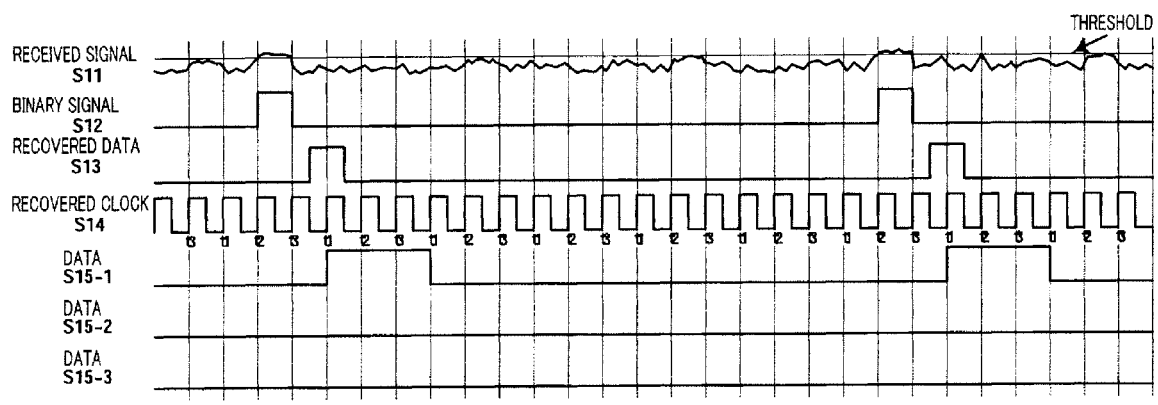
FIG. 6A is a timing chart for illustrating the operation of the pulse signal receiving apparatus according to Embodiment 2.

FIG. 6A shows a signal waveform in a case where the amplification factor of amplifying section 201 is low. Given that the amplification factor of amplifying section 201 is low, the rate received signal S11 after amplification shows a signal level equal to or more than a threshold of binarizing section 101 is low, and, as a result, the rate binary signal S12 shows the high level is low. Consequently, the rate recovered data S13 shows the high level is low, and, as a result, the rate data S15-1, S15-2 and S15-3 each show the high level is low, and "1" is less frequently decided as demodulation data. Generally, assuming that "0" and "1" are transmitted at a rate of fifty percent on average, it can be predicted that, with an example shown in FIG. 6A, because the amplification factor is low, binarizing section 101 does not decide the high level accurately and the rate of deciding the low level by error is high.

Figure 6B:
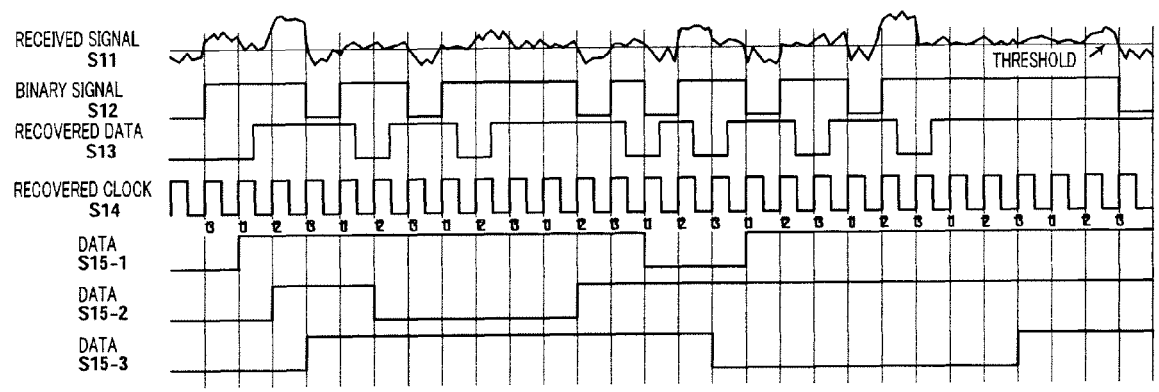
FIG. 6B is a timing chart for illustrating the operation of the pulse signal receiving apparatus according to Embodiment 2.

By contrast with this, FIG. 6B shows a signal waveform in a case where the amplification factor of amplifying section 201 is high compared to FIG. 6A. Given that the amplification factor of amplifying section 201 is high compared to FIG. 6A, the rate received signal S11 after amplification shows signal levels exceeding the threshold of the binarizing section increases, and, as a result, the rate data S15-1, S15-2 and S15-3 each show the high level increases compared to FIG. 6A. Consequently, the rate recovered data S13 shows the high level becomes high, and, as a result, the rate data S15-1, S15-2 and S15-3 each show the high level increases and "1" is more likely to be decided as demodulation data. As described above, assuming that "0" and "1" are transmitted to pulse signal receiving apparatus 100 from the communicating party (not shown) at equal rates, the amplification factor is too high with the example shown in FIG. 6B. In this way, it is predicted that, in binarizing section 101, the rate of deciding the high level by error without deciding the low level accurately is high.

Figure 6C:
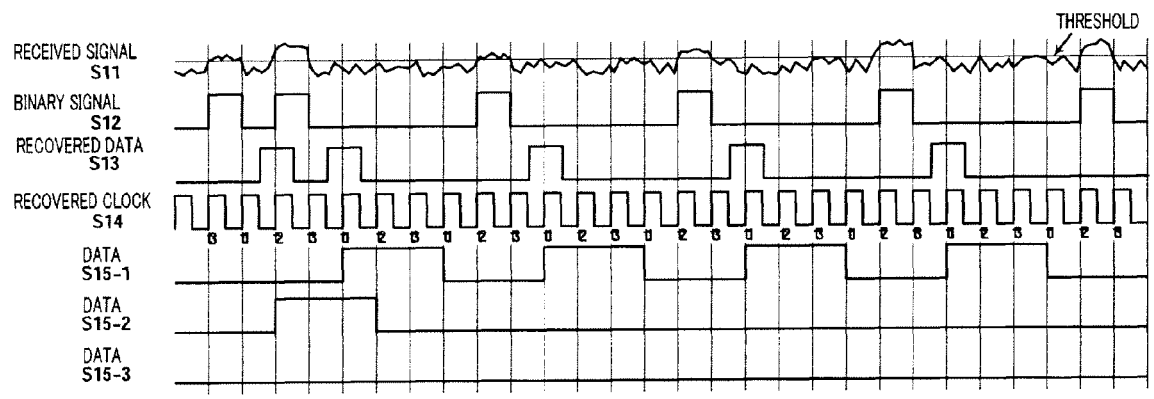
FIG. 6C is a timing chart for illustrating the operation of the pulse signal receiving apparatus according to Embodiment 2.

FIG. 6C shows a signal waveform in a case where the amplification factor of amplifying section 201 is high compared to FIG. 6A and is low compared to FIG. 6B. Upon comparison of FIG. 6C with FIG. 6A and FIG. 6B, by adjusting the amplification factor optimally by amplification factor controlling section 202, data S15-1, S15-2 and S15-3 each show the high level at adequate rates.

That is, assuming that "1" and "0" are generally transmitted at equal rates, by monitoring count values S16-1, S16-2 and S16-3 and changing the amplification factor in amplification factor controlling section 202 such that the rate of deciding "1" in a predetermined period and the rate of deciding "0" are almost equal, it is possible to adjust the amplification factor of amplifying section 201 to an optimal value. As a result, the rate the binary signal shows the high level becomes adequate, so that it is possible to improve received quality.

Further, in a case where "1" is transmitted to pulse signal receiving apparatus 200 from the communicating party (not shown), the high level is detected ideally only at one of sampling timings t1, t2 and t3. Consequently, amplification factor controlling section 202 may compare the numbers of times the high level is counted between sampling timings t1, t2 and t3 and control the amplification factor. For example, in a case where the high level is detected at all of sampling timings t1, t2 and t3, given that the amplification factor is too high, amplification factor controlling section 202 controls the amplification factor of amplifying section 201 to be low.

Further, the ideal values for count values S16-1, S16-2 and S16-3 in a case where a known data pattern is received are determined uniquely. Consequently, by monitoring count values S16-1, S16-2 and S16-3 in a case where a known data pattern is transmitted from the communicating party (not shown) and controlling the amplification factor so as to correct the offset from the ideal value in amplification factor controlling section 202, it is possible to control the amplification factor more accurately and improve received quality.

Figure 7:
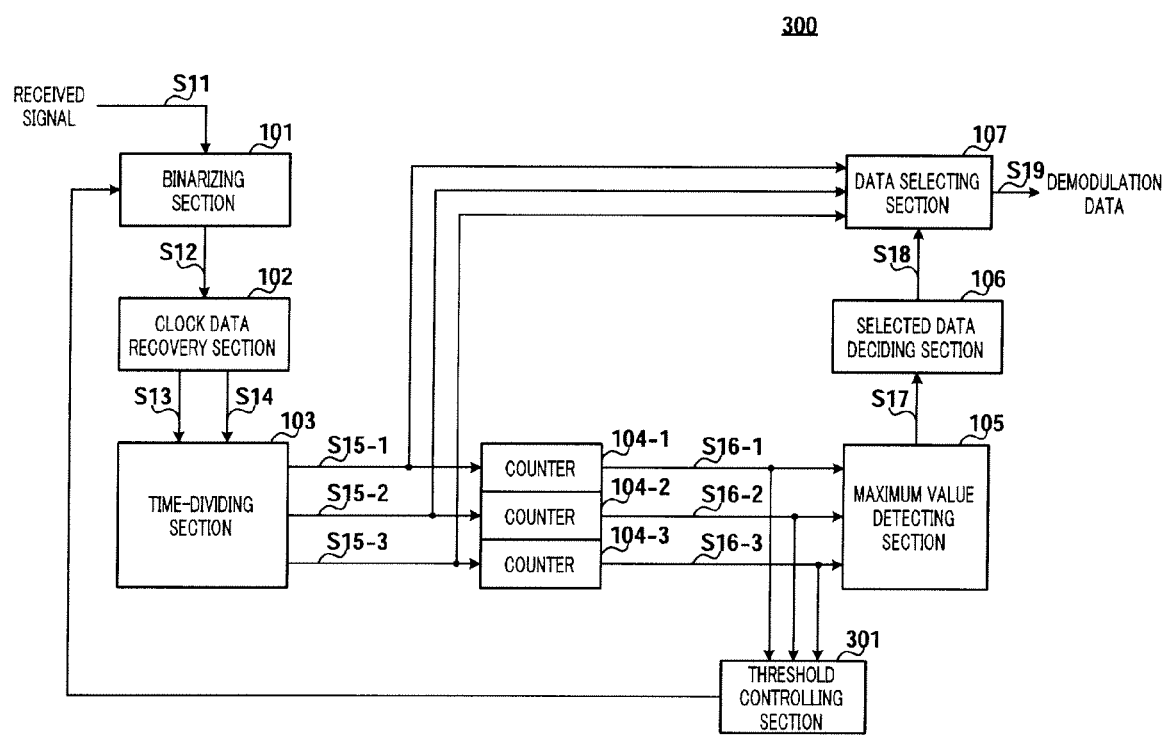
FIG. 7 is a block diagram showing the other main configuration of the pulse signal receiving apparatus according to Embodiment 2 of the present invention.

Further, although, with the above description, amplification factor controlling section 202 changes the amplification factor of amplifying section 201 and controls the amplification factor such that received signal S11 after amplification shows an optimal level, the threshold in binarizing section 101 may be changed according to the number of times the high level is counted instead of the amplification factor. FIG. 7 shows a main configuration of pulse signal receiving apparatus 300 in a case where the threshold of binarizing section 101 is changed. Pulse signal receiving apparatus 300 according to Embodiment 2 of the present invention in FIG. 7 employs a configuration that has threshold controlling section 301 instead of amplification factor controlling 202 of FIG. 5 and removes amplifying section 201.

Threshold controlling section 301 changes the threshold in binarizing section 101 according to the numbers of times data S15-1, S15-2 and S15-3 each show the high level. To be more specific, if the number of times the high level is counted is low, threshold controlling section 301 decreases the threshold in binarizing section 101. Consequently, the rate the binary signal is converted into the high level by binarizing section 101, increases. On the other hand, if the number of times the high level is counted is high, threshold controlling section 301 increases the threshold of binarizing section 101. Consequently, the rate the binary signal is converted into the high level by binarizing section 101, decreases.

In this way, by adjusting the threshold according to the number of times the high level is counted, similar to the case where the amplification factor is adjusted to an adequate value, the rate the binary signal shows the high level is adequate, so that it is possible to improve received quality.

Embodiment 3

With the present embodiment, a case will be described where the received signal is a pulse QPSK modulated signal.

That is, the present embodiment relates mainly to a pulse QPSK signal receiving apparatus for a QPSK modulated signal having an extremely short signal width. The present invention is applicable to a QPSK modulated signal having an extremely short signal width. The QPSK modulated signal having an extremely short signal width can be processed as a pulse modulated signal in many processings, and is referred to as "pulse QPSK signal" with the present embodiment.

Figure 8:
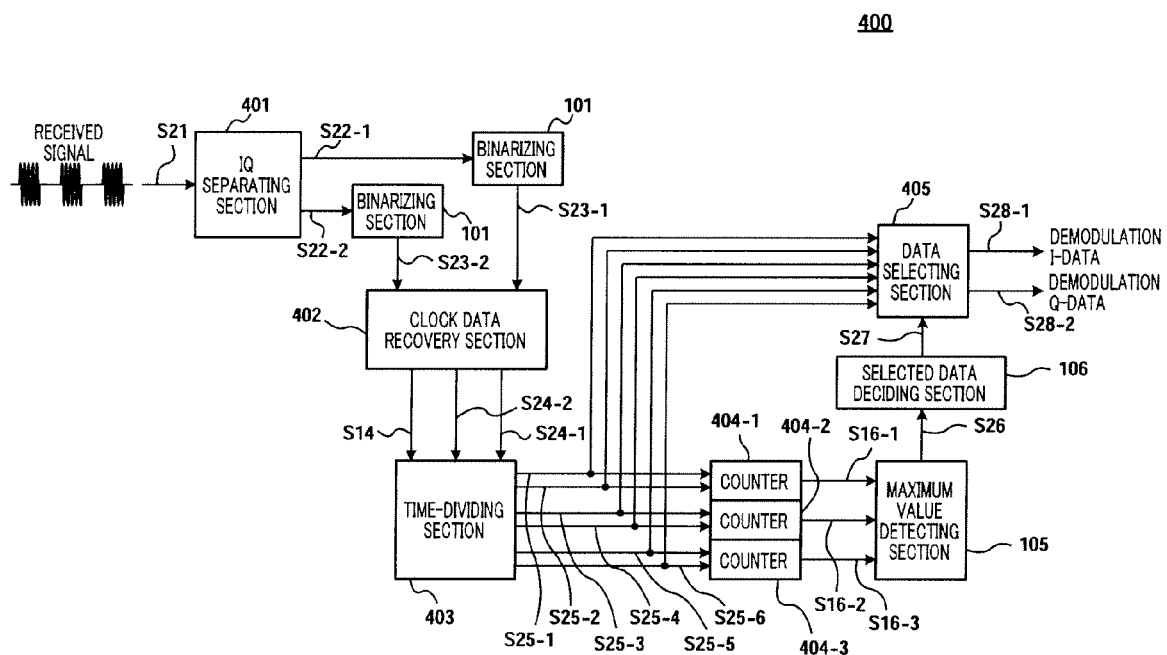
FIG. 8 is a block diagram showing a main configuration of a pulse QPSK signal receiving apparatus according to Embodiment 3 of the present invention.
Figure 9:
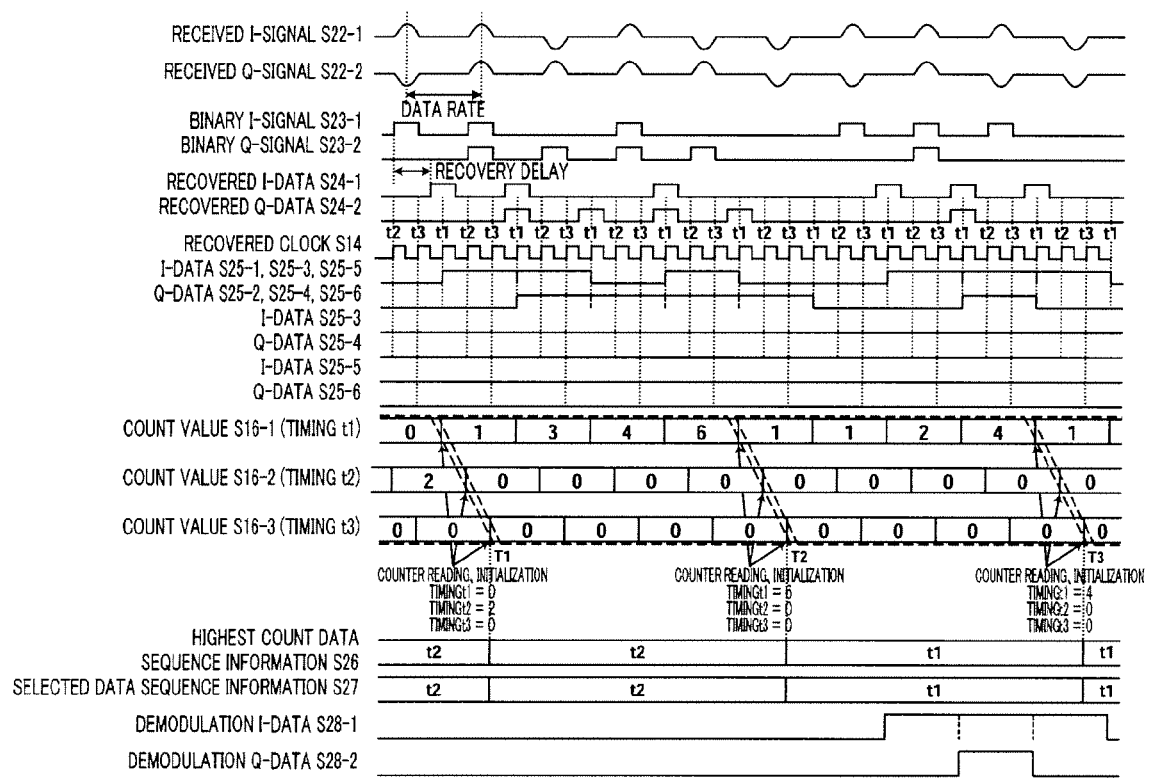
FIG. 9 is a timing chart for illustrating the operation of the pulse QPSK signal receiving apparatus according to Embodiment 3.

FIG. 8 shows a main configuration of the pulse QPSK signal receiving apparatus according to Embodiment 3 of the present invention. For the description of the present embodiment, the same components as in FIG. 2 will be assigned the same reference numerals and repetition of description will be omitted. Further, FIG. 9 is the timing chart of each section of the pulse QPSK signal receiving apparatus.

Pulse QPSK signal receiving apparatus 400 shown in FIG. 8 has IQ separating section 401, two binarizing sections 101, clock data recovery section 402, time-dividing section 403, counters 404-1, 404-2 and 404-3, maximum value detecting section 105, selected data deciding section 106 and data selecting section 405.

IQ separating section 401 performs quadrature detection of pulse QPSK signal 21 and separates pulse QPSK signal 21 to the I-component and the Q-component. IQ separating section 401 outputs resulting received I-signal S22-1 and received Q-signal S22-2 to binarizing sections 101, respectively.

Binarizing sections 101 perform threshold decision of amplitude levels of received I-signal S22-1 and received Q-signal S22-2 outputted from IQ separating section 401. Next, binarizing sections 101 convert received I-signal S22-1 and received Q-signal S22-2 each into a binary represented by the low level and the high level. Next, binarizing sections 101 output binary I-signal S23-1 and binary Q-signal S23-2 after conversion, to clock data recovery section 402.

Clock data recovery section 402 generates recovered I-data S24-1, recovered Q-data S24-2 and recovered clock S14 from binary I-signal S23-1 and binary Q-signal S23-2. To be more specific, clock data recovery section 402 detects points of level change of the received signal of one or both of binary I-signal S23-1 and binary Q-signal S23-2.

Next, clock data recovery section 402 controls the frequency and phase of the clock signal held in clock data recovery section 402 to synchronize with the detected points of level change and generates the controlled clock signal, as recovered clock S14.

Hereinafter, a case will be described as an example where a pulse QPSK signal having a signal width of a one-third of one symbol period, is transmitted from the communicating party (not shown), and, as shown in FIG. 9, binarizing sections 101 generate binary I-signal S23-1 and binary Q-signal S23-2 having a signal width of a one-third of one symbol period.

Clock data recovery section 402 generates recovered clock S14 having rising edges at timings t1, t2 and t3 (sampling timings) in one symbol period. At the rising edges of recovered clock S14, clock data recovery section 402 samples binary I-signal S23-1 and binary Q-signal S23-2 and acquires recovered I-data S24-1 and recovered Q-data S24-2. Clock data recovery section 402 outputs generated recovered I-data S24-1, recovered Q-data S24-2 and recovered clock S14 to time-dividing section 403.

Time-dividing section 403 samples recovered I-data S24-1 and recovered Q-data S24-2 at sampling timings t1, t2 and t3 of sampled recovered clock S14 and time-divides the I-data and Q-data, into IQ data sequence groups, per sampling timing. To be more specific, time-dividing section 403 outputs I-data S25-1 and Q-data S25-2 sampled at sampling timing t1 to counter 404-1, I-data S25-3 and Q-data S25-4 sampled at sampling timing t2 to counter 404-2, I-data S25-5 and Q-data S25-6 sampled at sampling timing t3 to counter 404-3.

Further, time-dividing section 403 outputs I-data 25-1, 25-3, and 25-5 and Q-data 25-2, 25-4, and 25-6 to data selecting section 405. Further, the number of samples taken in one symbol period is not limited to three.

In a case where clock data recovery section 402 generates a clock having four or more rising edges in one symbol period, time-dividing section 403 samples recovered I-data S24-1 and recovered Q-data S24-2 every rising edge, and time-divides recovered I-data S24-1 and Q-data S24-2 into four or more data sequences.

Counters 404-1, 404-2 and 404-3 count the numbers of times I-data and Q-data, time-divided into IQ data sequence groups by time-dividing section 403 every sampling timing, each show the high level in a predetermined period and output the counted numbers of times the high level is counted, to maximum value detecting section 105.

To be more specific, counter 404-1 counts the numbers of times I-data S25-1 and Q-data S25-2 each show the high level in a predetermined period. Further, counter 404-2 counts the numbers of times I-data 25-3 and Q-data S25-4 each show the high level in a predetermined period. Further, counter 404-3 counts the numbers of times I-data 25-5 and Q-data S25-6 each show the high level in a predetermined period.

The number of times the high level is counted represents the total number of items of recovered data included in I-data and Q-data, respectively. Further, as described above, time-dividing section 403 assumes a case where recovered I-data S24-1 and recovered Q-data S24-2 are sampled three times per symbol period. In this way, although pulse QPSK signal receiving apparatus 400 has three counters, the number of samples taken in one symbol period is not limited to three, and the same number of counters as the number of times recovered I-data S24-1 and recovered Q-data S24-2 are sampled in one symbol in period time-dividing section 403, may be provided.

Maximum value detecting section 105 detects the greatest number of times the high level is counted from the numbers of times the high level is counted outputted from counters 404-1, 404-2 and 404-3. Next, maximum value detecting section 105 outputs information related to the data sequence groups counted by a counter in which the high level is counted the greatest number of times, that is, information related to the data sequence groups showing recovered I-data and recovered Q-data the greatest number of items, (hereinafter "highest count data sequence group information"), to selected data deciding section 106.

Highest count data sequence group information S26 may be information associated one to one with the time-divided data sequence group such as information related to a sampling timing at which the data sequence group showing the high level the greatest number of times, is sampled or information related to the counter in which the high level is counted the greatest number of times. A case will be described below where the sampling timing at which the data sequence group showing the high level the greatest number of times, is sampled, is used as highest count data sequence group information S26.

According to highest count data sequence group information S26 outputted from maximum value detecting section 105, selected data deciding section 106 decides which data sequence group must be selected as the demodulation data sequence group from the three sets of I-data S25-1 and Q-data S25-2, I-data S25-3 and Q-data S25-4, and I-data S25-5 and Q-data S25-6, sampled at sampling timings t1, t2 and t3, respectively, and outputs information related to the decided data sequence group, to data selecting section 405 as selected data sequence group information S27.

To be more specific, similar to Embodiment 1, selected data deciding section 106 monitors the change of highest count data sequence group information S26, does not change selected data sequence group information S27 immediately even if highest count data sequence group information S26 changes and changes selected data sequence group information S27 if highest count data sequence group information S26 continues showing the same information a predetermined number of times or more after the change.

Data selecting section 405 selects the data sequence matching selected data sequence group information S27 from the three sets of I-data S25-1 and Q-data S25-2, I-data S25-3 and Q-data S25-4, and I-data S25-5 and Q-data S25-6, outputted from time-dividing section 403, as demodulating I-data S28-1 and demodulating Q-data S28-2.

Next, the operation of pulse QPSK signal receiving apparatus 400 configured as described above will be described with reference to the timing chart of FIG. 9.

Two binarizing sections 101 perform threshold decision of received I-signal S22-1 and received Q-signal S22-2, respectively. Next, binarizing sections 101 convert received I-signal S22-1 and received Q-signal S22-2 after decision into binary I-signal S23-1 and binary Q-signal S23-2 represented by the low level and the high level, and output binary I-signal S23-1 and binary Q-signal S23-2 to clock data recovery section 402.

Then, clock data recovery section 402 generates recovered I-data S24-1, recovered Q-data S24-2 and recovered clock S14 from binary I-signal S23-1 and binary Q-signal S23-2. Next, clock data recovery section 402 outputs recovered I-data S24-1, recovered Q-data S24-2 and recovered clock S14 to time-dividing section 403. For example, in a case where, as shown in FIG. 9, recovered I-data S24-1 and recovered Q-data S24-2 have a signal width of a one-third of one symbol period, clock data recovery section 402 generates a clock having rising edges at timings t1, t2 and t3 in one symbol period as recovered clock S14.

Then, time-dividing section 403 samples recovered I-data S24-1 and recovered Q-data S24-2 using t1, t2 and t3 of recovered clock 514 as sampling timings. Next, time-dividing section 403 time-divides sampled I-data and Q-data, into IQ data sequence groups per sampling timing.

To be more specific, time-dividing section 403 time-divides sampled recovered I-data and recovered Q-data, into I-data S25-1 and Q-data S25-2, I-data S25-3 and Q-data S25-4, and I-data S25-5 and Q-data S25-6. That is, recovered I-data S24-1 and recovered Q-data S24-2 sampled at timing t1 of recovered clock S14 are distributed to I-data S25-1 and Q-data S25-2, respectively. Further, recovered I-data S24-1 and recovered Q-data S24-2 sampled at timing t2 of recovered clock S14 are distributed to I-data S25-3 and Q-data S25-4, respectively. Furthermore, recovered I-data S24-1 and recovered Q-data S24-2 sampled at timing t3 of recovered clock S14 are distributed to I-data S25-5 and Q-data S25-6, respectively.

Then, IQ data group sequences of I-data S25-1 and Q-data S25-2, I-data S25-3 and Q-data S25-4, and I-data S25-5 and Q-data S25-6 sampled at timings t1, t2 and t3, respectively, are outputted to data selecting section 405 and, further, to counters 404-1, 404-2 and 404-3, respectively. Counters 404-1, 404-2 and 404-3 count the numbers of times I-data S25-1 and Q-data S25-2, I-data S25-3 and Q-data S25-4, and I-data S25-5 and Q-data S25-6 each show the high level in a predetermined period. Further, although for count values S16-1, S16-2 and S16-3 of FIG. 9, the numbers of times the high level is counted every four symbols by setting the above predetermined period with four symbols, the predetermined period is not limited to four symbols and may be adjusted according to the symbol rate and channel conditions.

Then, the numbers of times the high level is counted every four symbols are outputted to maximum value detecting section 105. Next, maximum value detecting section 105 outputs information related to the data sequence group showing the high level the greatest number of times (i.e. highest count data sequence group information) to selected data deciding section 106 per predetermined period. For example, upon comparison of the numbers of times the high level is counted at counter reading timing T2 shown in FIG. 9, S16-1 shows six, S16-2 shows zero and S16-3 shows zero, and I-data S25-1 and Q-data S25-2 are the data sequence group showing the high level the greatest number of times. By this means, sampling timing t1 at which I-data S25-1 and Q-data S25-2 are sampled is outputted to selected data deciding section 106 as highest count data sequence group information S26.

Then, selected data deciding section 106 monitors transition of highest count data sequence group information S26. Next, depending on the transition of highest count data sequence group information S26, selected data deciding section 106 decides which data sequence must be selected as demodulation data from the three sets of I-data S25-1 and Q-data S25-2, I-data S25-3 and Q-data S25-4, and I-data S25-5 and Q-data S25-6 sampled at sample timings t1, t2 and t3, respectively. Next, selected data deciding section 106 outputs information related to decided data to data selecting section 405 as selected data sequence group information S27.

Then, data selecting section 405 selects data matching selected data sequence group information S27 from I-data S25-1 and Q-data S25-2, I-data S25-3 and Q-data S25-4, and I-data S25-5 and Q-data S25-6 outputted from time-dividing section 403, as demodulation I-data S28-1 and demodulation Q-data S28-2. With the above-described example, selected data sequence group information S27 is t1 at counter reading timings T2 to T3. In this way, I-data S25-1 and Q-data S25-2 sampled at timing t1 are selected as demodulation I-data S28-1 and demodulation Q-data S28-2.

As described above, according to the present embodiment, first, in a case where a pulse QPSK signal that employs as the signal width a shorter time width than the symbol period and that is transmitted at a predetermined timing in the symbol period, is received, if threshold decision of the received I-signal and the received Q-signal after quadrature conversion is performed, the received I-signal and the received Q-signal are converted into a binary I-signal and a binary Q-signal represented by the low level and the high level. Next, using the conventional clock recovery technique, a clock signal, an I-data signal and a Q-data signal are recovered from the binary I-signal and the binary Q-signal after conversion. Next, at the timing of the rising edges of the clock signal, the I-data signal and the Q-data signal are over-sampled. Next, the over-sampled I-data signal and Q-data signal are time-divided into the same number of data sequence groups as the number of periods in the clock signal included in one symbol period. Next, the highest count data sequence group showing the high levels the greatest number of times in a predetermined period is detected from the time-divided data sequence groups. Next, a demodulation data sequence group in a predetermined period is selected from the time-divided data sequence group according to the detected highest count data sequence group.

By contrast with this, the conventional art, first, recovers a clock signal using the conventional clock recovery technique for the pulse QPSK signal employing as the signal width a shorter time width than the symbol period. Next, the clock signal synchronized with a shorter signal width than the symbol period is recovered. Therefore, according to the conventional art, there are cases where undesired data is sampled at a timing at which there is no data essentially.

As described above, according to the present embodiment, it is possible to remove undesired data with a comparatively simple configuration as compared to the conventional art and extract only desired data sampled at the desired sampling timings.

The pulse signal receiving apparatus according to the present invention employs a configuration including: a receiving means that receives a pulse signal; a binarizing means that performs threshold decision of a voltage of the pulse signal and converts the voltage of the pulse signal into a binary signal; a clock data recovery means that obtains a clock synchronized with the binary signal and recovered data obtained by sampling the binary signal using the clock; a time-dividing means that time-divides the recovered data into a plurality of data sequences; a counting means that counts a number of times recovered data is counted in a predetermined period on a per data sequence basis; and a data selecting means that selects a data sequence to be demodulated, from the plurality of data sequences, based on count values counted by the counting means.

According to this configuration, in a case where a pulse signal that employs as the signal width a shorter time width than the symbol period and that is transmitted at a predetermined timing in the symbol period, is received, if a clock is recovered by the clock recovery technique from a binary signal resulting from threshold decision of the voltage of the pulse signal, a recovered clock that employs as the clock period a shorter period than the symbol period is generated. In this way, although recovered data sampled at the rising edges of the recovered clock includes undesired data, by time-dividing the recovered data into a plurality of data sequences and selecting a candidate of a data sequence for actual use from a plurality of data sequences based on whether or not there is recovered data included in the time-divided data sequences, it is possible to remove undesired data. Consequently, it is possible to demodulate a pulse signal that employs as the signal width a shorter time width than the symbol period, with a comparatively simple configuration.

An aspect of the pulse signal receiving apparatus according to the present invention employs a configuration in which the time-dividing means forms the plurality of data sequences using the recovered data extracted per symbol period comprised of a plurality of periods of the clock.

According to this configuration, it is possible to separate recovered data sampled at the rising edges of the recovered clock employing as the clock period a shorter period than the symbol period, to a desired data sequence and undesired data sequence, with a comparatively simple configuration.

An aspect of the pulse signal receiving apparatus according to the present invention employs a configuration in which the data selecting means comprises a detecting means that detects a highest count data sequence including the greatest number of items of the recovered data in a predetermined period based on the count values, and selects the highest count data sequence if the highest count data sequence is the same a predetermined consecutive number of times.

According to this configuration, if the highest count data sequence including the greatest number of items of recovered data changes in a predetermined period, the highest count data sequence is not immediately selected as the data sequence for actual use, and, only in a case where the highest count data sequence is detected a predetermined consecutive number of times, the highest count data sequence is selected as the data sequence for actual use. Consequently, it is possible to prevent an undesired data sequence temporarily including a great number of items of recovered data due to the influence of, for example, interference signals, from being selected immediately.

An aspect of the pulse signal receiving apparatus according to the present invention employs a configuration in which the binarizing means adjusts a voltage of a received pulse signal based on the number of items of the recovered data per data sequence.

According to this configuration, it is possible to decrease the amplification factor if the number of items of recovered data included in a time-divided data sequence is equal to or greater than a predetermined number and increase the amplification factor if the number of items of recovered data included in the time-divided data is less than a predetermined number. Consequently, it is possible to adjust the voltage of the received pulse signal to an optimal level, and improve the accuracy of demodulation and improve received quality.

An aspect of the pulse signal receiving apparatus according to the present invention employs a configuration in which the binarizing means changes a threshold used in threshold decision based on the number of items of the recovered data per data sequence.

According to this configuration, it is possible to increase the threshold used in threshold decision if the number of items of recovered data included in the time-divided data sequence is equal to or more than a predetermined number, and decrease the threshold used in threshold decision if the number of items of recovered data included in the time-divided data sequence is less than a predetermined number. Consequently, it is possible to adjust the threshold used in threshold decision to an optimal value, and improve the accuracy of demodulation and improve received quality.

An aspect of the pulse QPSK signal receiving apparatus according to the present invention employs a configuration: a receiving means that receives a pulse quadrature phase shift keying modulated signal; a separating means that separates the quadrature phase shift keying modulated signal to an in-phase signal and a quadrature signal; a binarizing means that performs threshold decision of voltages of the in-phase signal and the quadrature signal and converts the voltages of the in-phase signal and the quadrature signal into binary signals; a clock data recovery means that obtains a clock synchronized with the binary signals and recovered data obtained by sampling the binary signals using the clock; a time-dividing means that time-divides the recovered data into a plurality of data sequences; a counting means that counts a number of times the recovered data is counted in a predetermined period on a per data sequence basis; and a data selecting means that selects a data sequence to be demodulated, from the plurality of data sequences based on count values counted by the counting means.

According to this configuration, in a case where a pulse QPSK signal that employs as the signal width a shorter time width than the symbol period and that is transmitted at a predetermined timing in the symbol period, is received, if a clock is recovered by the clock recovery technique from binary signals resulting from threshold decision of voltages of the I-signal and the Q-signal of the pulse QPSK signal, a recovered clock that employs as the clock period a shorter period than the symbol period is generated. In this way, although recovered data sampled at the rising edges of the recovered clock includes undesired data, by time-dividing the recovered data into a plurality of data sequences and selecting a candidate of a data sequence for actual use from a plurality of data sequences based on whether or not there is recovered data included in the time-divided data sequence, it is possible to remove undesired data. Consequently, it is possible to demodulate a pulse QPSK signal that employs as the signal width a shorter time width than the symbol period, with a comparatively simple configuration using the conventional clock recovery technique.

An aspect of the pulse QPSK signal receiving apparatus according to the present invention employs a configuration in which the binarizing means binarizes the voltage of the in-phase signal by threshold decision and converts the voltage of the in-phase signal into a binary in-phase signal, and binarizes the voltage of the quadrature signal by threshold decision and converts the voltage of the quadrature signal into a binary quadrature signal; the clock data recovery means obtains a clock synchronized with at least one of the binary in-phase signal and the binary quadrature signal and, further, obtains recovered in-phase data and recovered quadrature data by sampling the binary in-phase signal and the binary quadrature signal using the clock; the time-dividing means time-divides the recovered in-phase data and the recovered quadrature data into a plurality of in-phase and quadrature data sequence groups; the counting means counts numbers of times the recovered in-phase data and the recovered quadrature data are counted in the predetermined period, on a per in-phase and quadrature data sequence group basis; and the data selecting means selects a data sequence group to be demodulated, from the plurality of in-phase and quadrature data sequence groups based on count values counted by the counting means per in-phase and quadrature data sequence group.

According to this configuration, if a clock synchronized with at least one of the binary I-signal and the binary Q-signal obtained by binarizing the I-component and the Q-component of a QPSK modulated signal by threshold decision, is recovered, a recovered clock that employs as the clock period a shorter period than the symbol period is generated. In this way, although recovered I-data and recovered Q-data sampled at the rising edges of the recovered clock include undesired data, by time-dividing the recovered I-data and recovered Q-data into a plurality of data sequence groups and selecting a candidate of a data sequence group for actual use from a plurality of data sequence groups based on whether or not there are recovered I-data and recovered Q-data included in the time-divided data sequence group, it is possible to remove undesired data. Consequently, it is possible to demodulate a pulse QPSK signal that employs as the signal width a shorter time width than the symbol period, with a comparatively simple configuration using the conventional clock recovery technique.

An aspect of the pulse signal receiving method according to the present invention includes: receiving a pulse signal; performing threshold decision of a voltage of the pulse signal and converting the voltage of the pulse signal into a binary signal; obtaining a clock synchronized with the binary signal and recovered data obtained by sampling the binary signal using the clock; time-dividing the recovered data into a plurality of data sequences; counting a number of times the recovered data is counted in a predetermined period on a per data sequence basis; and selecting a candidate of a data sequence to be demodulated, from the plurality of data sequences based on a count value.

According to this method, in a case where the pulse signal that employs as the signal width a shorter time width than the symbol period and that is transmitted at a predetermined timing in the symbol period, is received, if a clock is recovered by the clock recovery technique from a binary signal resulting from threshold decision of the voltage of the pulse signal, a recovered clock that employs as the clock period a shorter period than the symbol period is generated. In this way, although recovered data sampled at the rising edges of the recovered clock includes undesired data, by time-dividing the recovered data into a plurality of data sequences and selecting a candidate of a data sequence for actual use from a plurality of data sequences based on whether or not there is recovered data included in the time-divided data, it is possible to remove undesired data. Consequently, it is possible to demodulate a pulse signal that employs as the signal width a shorter time width than the symbol period, with a comparatively simple configuration.

The disclosures of Japanese Patent Application No. 2006-115759, filed on Apr. 19, 2006, and Japanese Patent Application No. 2007-102085, filed on Apr. 9, 2007, including the specifications, drawings and abstracts, are incorporated herein by reference in their entirety.

Industrial Applicability

The pulse signal receiving apparatus, pulse QPSK signal receiving apparatus and pulse signal receiving method according to the present invention are able to detect a signal sampled at optimal clock timing from a pulse modulated signal that employs a shorter signal width than the symbol period, with a comparatively simple configuration. Particularly, the present invention is useful for the pulse signal receiving apparatus, pulse QPSK signal receiving apparatus and pulse signal receiving method that receive the pulse modulated signal that employs as the signal width a shorter time width than the symbol period.

The invention claimed is:

1. A pulse signal receiving apparatus comprising:
a receiving section that receives the pulse signal;
a binarizing section that performs threshold decision of a voltage of the pulse signal and converts the voltage of the pulse signal into a binary signal;
a clock data recovery section that obtains a clock synchronized with the binary signal and recovered data obtained by sampling the binary signal using the clock;
a time-dividing section that time-divides the recovered data into a plurality of data sequences;
a counting section that counts a number of times recovered data is counted in a predetermined period on a per data sequence basis; and
a data selecting section that selects a data sequence to be demodulated, from the plurality of data sequences, based on count values counted by the counting section.

2. The pulse signal receiving apparatus according to claim 1, wherein the time-dividing section forms the plurality of data sequences using the recovered data extracted per symbol period comprised of a plurality of periods of the clock.

3. The pulse signal receiving apparatus according to claim 1, wherein the data selecting section comprises a detecting section that detects a highest count data sequence including the greatest number of items of the recovered data in a predetermined period based on the count values, and selects the highest count data sequence if the highest count data sequence is the same as a predetermined consecutive number of times.

4. The pulse signal receiving apparatus according to claim 1, wherein the binarizing section adjusts a voltage of a received pulse signal based on the number of items of the recovered data per data sequence.

5. The pulse signal receiving apparatus according to claim 1, wherein the binarizing section changes a threshold used in threshold decision based on the number of items of the recovered data per data sequence.

6. A pulse quadrature phase shift keying modulated signal receiving apparatus comprising:
- a receiving section that receives the pulse quadrature phase shift keying modulated signal;
- a separating section that separates the pulse quadrature phase shift keying modulated signal to an in-phase signal and a quadrature signal;
- a binarizing section that performs threshold decision of voltages of the in-phase signal and the quadrature signal and converts the voltages of the in-phase signal and the quadrature signal into binary signals;
- a clock data recovery section that obtains a clock synchronized with the binary signals and recovered data obtained by sampling the binary signals using the clock;
- a time-dividing section that time-divides the recovered data into a plurality of data sequences;
- a counting section that counts a number of times the recovered data is counted in a predetermined period on a per data sequence basis; and
- a data selecting section that selects a data sequence to be demodulated, from the plurality of data sequences based on count values counted by the counting section.

7. The pulse quadrature phase shift keying signal receiving apparatus according to claim 6, wherein:
- the binarizing section binarizes the voltage of the in-phase signal by threshold decision and converts the voltage of the in-phase signal into a binary in-phase signal, and binarizes the voltage of the quadrature signal by threshold decision and converts the voltage of the quadrature signal into a binary quadrature signal;
- the clock data recovery section obtains a clock synchronized with at least one of the binary in-phase signal and the binary quadrature signal and, further, obtains recovered in-phase data and recovered quadrature data by sampling the binary in-phase signal and the binary quadrature signal using the clock;
- the time-dividing section time-divides the recovered in-phase data and the recovered quadrature data into a plurality of in-phase and quadrature data sequence groups;
- the counting section counts numbers of times the recovered in-phase data and the recovered quadrature data are counted in the predetermined period, on a per in-phase and quadrature data sequence group basis; and
- the data selecting section selects a data sequence group to be demodulated, from the plurality of in-phase and quadrature data sequence groups based on count values counted by the counting section per in-phase and quadrature data sequence group.

8. A pulse signal receiving method comprising:
receiving the pulse signal;
performing threshold decision of a voltage of the pulse signal and converting the voltage of the pulse signal into a binary signal;
obtaining a clock synchronized with the binary signal and recovered data obtained by sampling the binary signal using the clock;
time-dividing the recovered data into a plurality of data sequences;
counting a number of times the recovered data is counted in a predetermined period on a per data sequence basis; and
selecting a candidate of a data sequence to be demodulated, from the plurality of data sequences based on a count value.

* * * * *